UNITED STATES PATENT OFFICE.

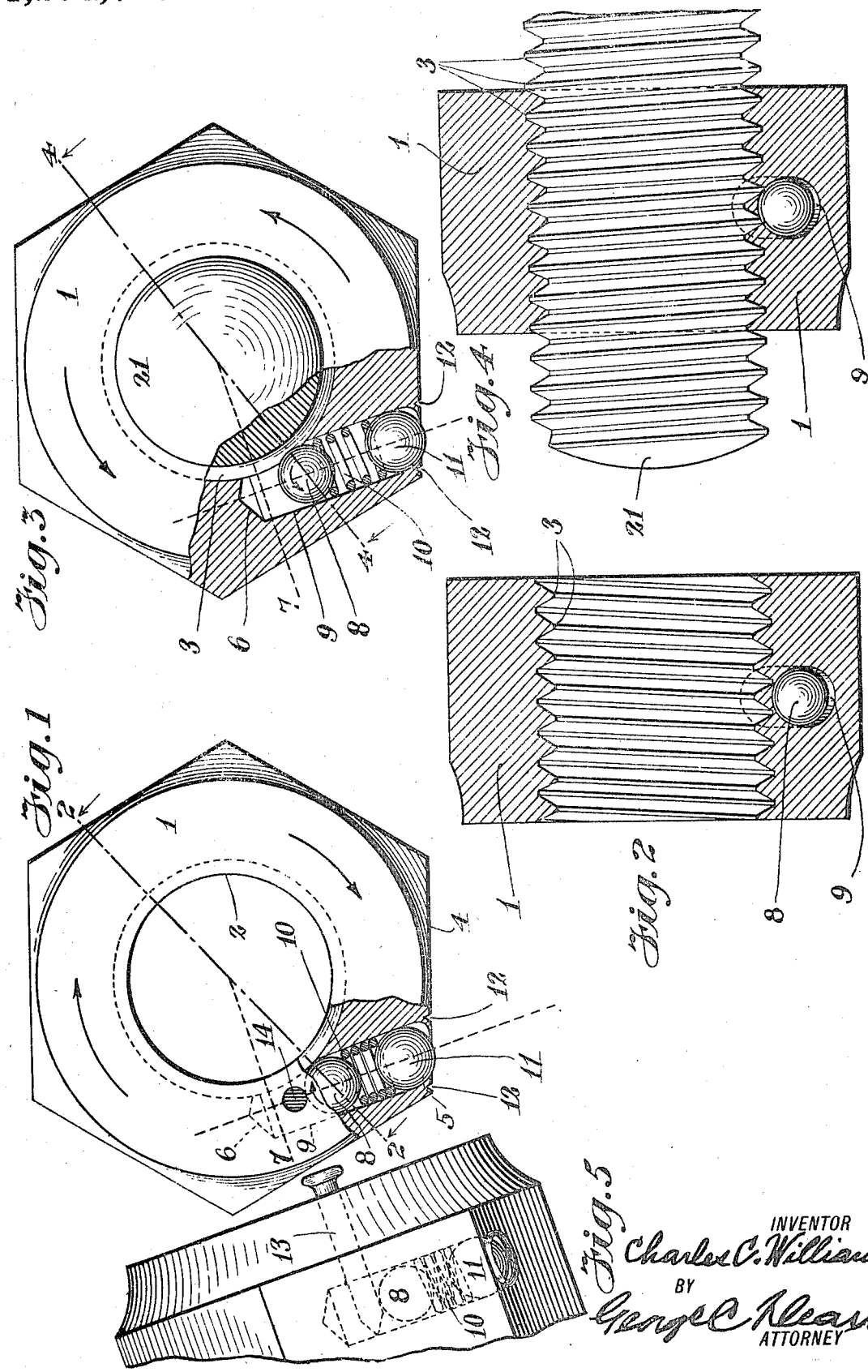

CHARLES C. WILLIAMS, OF DETROIT, MICHIGAN, ASSIGNOR, BY MESNE ASSIGNMENTS, TO EVERTITE NUT CORPORATION, OF DETROIT, MICHIGAN, A CORPORATION OF NEW YORK.

LOCK-NUT.

1,294,737.      Specification of Letters Patent.      Patented Feb. 18, 1919.

Application filed April 9, 1918. Serial No. 227,522.

*To all whom it may concern:*

Be it known that I, CHARLES C. WILLIAMS, a citizen of the United States, and resident of Detroit, in the county of Wayne and State of Michigan, have invented certain new and useful Improvements in Lock-Nuts, of which the following is a specification.

My present invention relates to lock nuts of the type in which a locking ball is arranged in a cylindrical passage drilled in from the side of the nut in such direction that it will break into the threaded interior more or less tangentially so that when the nut is screwed on to the bolt, the ball contacting with the bolt threads will be rolled along the drill passage in a direction away from the pinching point when the nut is screwed on, and toward the pinching point when the nut is screwed off.

This principle of operation is well understood and is not difficult of application where the lock need only be sufficient to resist moderate efforts against unscrewing, because, for such purposes, it is unnecessary to pay any particular attention to how many threads or what part of the threads of the bolt is engaged by the ball nor whether or how far the ball will bite into the thread when the nut is forcibly unscrewed.

In the case of the ordinary commercial nuts and bolts which are now turned out by the million at small cost by automatic machinery, however, the nuts must be locked securely against violent unscrewing efforts, and the resistance to unscrewing must be the same for all nuts of the same size, yet the ordinary commercial nuts and bolts are roughly made and the threads of the bolt fit the grooves in the nut very loosely so that the drill hole crosses the threads obliquely and without special reference to the peaks and valleys of the screw threads of the bolt. Moreover, the loose fit leaves room for considerable yielding and molding of the bolt thread by the ball and as the metal of such bolts is relatively soft, it commonly results that the bolt may be unscrewed by moderate force, the hard steel ball simply upsetting or molding the metal of the bolt thread thus taking up the loose fit of the threads without affording any very great resistance to the unscrewing effort.

The primary object of my present invention is to accomplish economical quantity production of commercially uniform reliable lock nuts using the ordinary commercial nuts and ordinary steel bearing balls as the raw material, so that lock nuts of the ball type may be made commercially available for ordinary uses. I accomplish this by a novel combination of features whereby all the desirable functions may be secured by merely drilling a hole in the nut, inserting ball with a spring to push the ball forward, and a plug to close the hole. The plug is preferably another ball of the same or slightly larger size than the locking ball and it may be secured by hammering or punching some of the metal of the nut at the drill hole entrance. No other securing means is necessary since the plug ball sustains only the negligible thrust of the spring, the violent wedging thrust of the locking ball being directed only against the wall and bottom of the drill hole.

In order to make it unimportant whether the wall of the drill hole happens to break into the screw thread cavity nearest the valley or nearest the peak of the thread, the lock ball is made of a diameter not less than one and a quarter times the thickness of the threads, and the drill hole is located so that the straight line path of the ball when forcibly rolled to the point of tangency or nearest approach to the axis of the bolt, will be sure to intercept a cross-section of metal approximately equivalent to the major portion of one bolt thread, regardless of whether the ball happens to register with a single thread or with parts of two adjacent threads. As the peak half of a bolt thread contains only about ¼ to ⅓ the total cross-section of the thread, this requires that for a ball as small as one and one quarter threads, the ball path should cut into the bolt thread space approximately the full depth of a thread, and even for balls twice that diameter, the depth should be not less than two-thirds to three-quarters the depth of the thread.

The diameter of the ball should not be larger than the latter size for several reasons. One is that the surface engaging the bolt thread should be small enough and of sufficiently sharp curvature to bite into the metal of the bolt thread and roll it backward where it will form a fairly abrupt locking shoulder upon slight reverse screwing. Too large a ball will merely compress the bolt threads inward because it attacks the bolt thread at too smooth and too easy an angle and hence will permit unscrewing too great a distance with too little effort, sometimes failing to give a positive lock even at the point of greatest wedging compression.

Another advantage of having the ball diameter at least one and a quarter screw threads is that with screw threads of ordinary commercial proportions, this will permit the ball to project into the screw thread space, nearly the depth of a screw thread while having substantially less than half the diameter of the ball projected for action on the metal of the bolt thread when at the point of deepest engagement.

Another feature consists in drilling the hole only a little, preferably less than its own diameter, beyond the point of nearest approach to the axis of the nut so that the ball will contact with the bottom of the hole and be stopped from further travel at or just in advance of the point of maximum projection into the bolt hole, that is, the point of smallest distance between bolt and the opposite wall of the drill hole. If the hole is deeper than this there is danger that violent unscrewing effort will roll the ball beyond the tangent point and so release its grip on the bolt. With this arrangement of drill hole and with a ball not too big to bite into the metal of the bolt threads, the ball will be capable of stripping or rolling the metal of the bolt thread parallel with the surface of the bolt instead of compressing it all inward toward the center. Stripping or rolling backward only a short length of thread in this way will develop heat and collect surplus metal sufficient to inseparably weld the bolt and nut so that all unscrewing movement ceases and further violence can serve only to twist off the shank of the bolt. On the other hand, a very slight screwing-on movement will ordinarily roll the ball back and release it from the wedging pressure so that it can be easily disengaged by inserting a pin or small nail through a small transverse hole provided for such purpose.

While the above features of my invention are particularly adapted for insuring reliable locking of commercial nuts and bolts with loose fitting threads, it is obvious that the certain features of my invention will be useful though less necessary where the threads are more accurately cut or where the metal of the bolt is of much greater hardness.

I show my invention herein embodied in a nut of the hexagonal type. Commercial nuts of this shape are so proportioned that entering the drill at a tangent to the nut threads requires breaking into the corner of the nut, and drilling the tangent parallel with one side of the nut requires entering the drill through an adjacent side at a 60° angle. I avoid both of these difficulties by entering the drill near one corner but without mutilating the corner. With balls of the size above indicated, that is, not more than 2 nor less than $1\frac{1}{4}$ threads in diameter, it becomes possible to enter the drill at an easy angle, say 69° to 75° and yet have the wall of the drill hole break through the threads substantially tangent to the tips of the nut threads. This angle of drilling with this size of ball reduces the depth and cross-section of the drill hole and decreases cost of drilling.

By slightly grinding or otherwise roughening the surface of ordinary steel bearing balls now commercially available in enormous quantities at low prices, and by selecting a size big enough to surely cover at least one full screw thread regardless of whether the drill happens to strike a thread peak or a thread valley yet small enough to bite into the metal of the bolt, and at the limit to be stopped by the bottom of the hole in position to strip an amount of metal equal to at least one thread of the bolt, I have succeeded in quantity production of the hex lock nuts of commercially uniform efficiency, cheap enough to compete with and displace ordinary hex nuts in many lines where the latter have been universally used heretofore.

A desirable embodiment of the above described features of my invention is shown in the accompanying drawings in which—

Figure 1 is a top plan view of a nut partly in section;

Fig. 2 is a section on the line 2—2, Fig. 1;

Fig. 3 is a top plan view of the nut secured on to the bolt and broken away to a horizontal section showing the locking ball in its primary position of locking relation to the bolt, before any violent unscrewing effort has been applied;

Fig. 4 is a section on the line 4—4, Fig. 3; and

Fig. 5 is a side elevation showing in dotted lines the application of the unlocking pin for forcing and holding the ball out of locking relation to the bolt.

These drawings are approximately scale enlargements showing my invention applied to a $\frac{5}{8}''$ hex nut of recognized standard proportions. The nut 1 has a threaded bolt opening 2 of a diameter substantially $\frac{1}{2}$ the maximum diameter of the nut from corner to corner. The threads 3 are of standard pitch being approximately 11 to the inch for the ⅜" nut. The threads are of standard shape having an outline which is approximately a series of equilateral triangles with the tips slightly cut off and the bottoms slightly filled in. Some of these details of the standard construction are unimportant and may be varied, but most of them as well as any variations thereof should be taken into account in the application of my invention thereto. Hence, in order to make the principles of the invention more generally applicable in cases where shape or pitch or sizes of the screw threads are different, I have made the width and depth of the screw threads, whatever they may be, the basis for determining the special proportions and relations of parts constituting my invention.

It has not been considered practicable to show in the drawings the inaccuracy of the fit of the bolt threads in the nut threads and hence the drawings give no indication of how much the ridge of the threads may be rolled down before the metal of the bolt thread will actually fit the nut thread. The drawings do show, however, that the threads being of equilateral-triangle shape, the outer or ridge half of a thread contains an amount of metal theoretically equal to a quarter and practically equal to less than a quarter of the total cross section of metal in the thread.

In this particular case, the drill was entered in the side 4 near the corner 5 at an angle of 72° from the face 4 and was of such size, in this case over 3 times the depth of the screw threads, that the side of the drill hole breaks into the thread cavity of the nut tangent to the ridges of the nut thread. The drill hole is stopped at 6 at a point only slightly beyond the radial dotted line where the axis of the drill hole has its point of nearest approach to the bolt 21. The distance of the bottom of the drill hole beyond the tangent point, that is beyond radius 7, is preferably less than the radius of the ball 8 and must not be very much more than that radius, the object being to afford a positive stop to the inward rolling of the ball so that it may never be possible to have the latter rolled inward to a point where the straight wall 9 of the drill hole would recede from the bolt sufficient to release the ball.

The ball 8 is backed by spring 10 and a plug ball 11 affording a thrust for the spring and a closure for the drill hole is secured in place by swaging or mashing the metal around the mouth of the hole as at 12.

By comparison of Figs. 1 and 3, it will be seen that in Fig. 1, the locking ball 8 has been forced rearwardly to a point where it is barely tangent to the screw threads, a position which it may be made to assume either by inserting pin 13 through hole 14 as indicated in Fig. 5 or by simply screwing the nut on to the bolt in the ordinary way.

When the nut is being screwed on by right hand rotation indicated by the arrows on Fig. 1, the ball 8, pressing against the periphery of the bolt simply rolls thereon in the direction indicated by the small arrow in Fig. 1. This direction tends to roll the ball along the surface 9 away from the tangent point and hence out of locking relation with the bolt. It is continuously spring pressed into engagement with the bolt, however, and when any attempt is made to unscrew the nut in the direction of the arrows indicated on Fig. 3, the ball tends to roll along the wall 9 toward the point of nearest approach of said wall to the bolt axis. If the unscrewing effort is only moderate, the ball will merely wedge against the bolt thread without seriously deforming it but if sufficient power be applied, it will be rolled still farther back mutilating the metal of the bolt thread until by the time it abuts against the bottom 6, it will have rolled forwardly or inwardly an amount of the metal approximately equal to the cross-section of a bolt thread and being no longer free to roll, will strip metal of the thread until the heat and accumulation of metal is sufficient to practically weld the nut and bolt.

In all ordinary cases, the ball 8 may be forced back out of locking position by inserting the pin 13 through the hole 14, but where great violence has been used and the ball has been rolled in to the bottom of the hole, the ball can only be brought back within range of operation of the pin by slightly screwing the nut downward, thus rolling it out of tangent position but in the extreme case where the unscrewing has been sufficiently violent to strip a considerable amount of metal, the nut cannot be removed except by destroying the bolt or nut or both.

It will be noted that in the drawings the ball is of a diameter equal to the width of nearly two screw threads and that when forced to the bottom of the drill hole, it has approximately ⅛ to ¼ of its diameter projecting into the bolt thread space and that this is sufficient to cause the ball to intercept the bolt threads nearly to the bottom thereof.

From my previous explanation of the invention, it will be understood that a ball only 1¼ threads in diameter should have approximately two-fifths of its diameter projecting into the bolt thread space when the ball is at the tangent point, where it contacts with the bottom of the drill hole.

It will also be evident that if a ball and drill be used, that is much more than three threads in diameter, the drill hole would have to enter the side 4 of the nut at an angle considerably less than 69° for otherwise the drill hole would strike the thread cavity considerably inside the tips of the nut threads with the result that the ball would engage the threads at a steep angle so that when the nut is unscrewed there would be danger of the ball slipping on the bolt threads instead of being rolled inward to lock them tighter. Moreover, there would not be room for the spring 10 and the plug ball 11.

The spring 10 is so made that when in the position shown in Fig. 3, it is under no compression strain such as would make it follow the ball 8 beyond its position shown in said figure. Consequently, if the ball is rolled farther forward, the spring will not follow it, will not engage the threads of the bolt and hence will not be dragged into the narrow point where it would be likely to be laterally compressed, deformed or twisted out of shape.

From the detailed explanation of the principles of my invention first above given, and the further description of the desirable embodiment thereof shown in the drawings, any one skilled in the art will be able to apply the same to various sizes and models of nuts and to nuts having screw-threads of different pitch, depth or cross-section.

I claim:

1. A nut lock for screw bolts of the class described, comprising a nut having hexagonal sides and a screw threaded bolt hole approximately one-half the diameter of the nut, said nut having a straight sided cylindrical hole of a diameter not less than one and one-quarter times the thickness of a screw thread, drilled into one of the hexagonal sides of the nut at an angle of 69 to 75 degrees to said side and at a point near but not cutting an adjacent side, said drill hole being directed so as to break into the interior threads substantially tangent to the tips or ridges of said threads and terminating beyond the tangent point a distance not greater than its own diameter, in combination with a hard steel locking ball having a roughened surface loosely fitting said drill hole and adapted when at the point of tangency and in contact with the rear wall of the drill hole, to project into the bolt thread space approximately the depth of the screw thread yet substantially less than one-half the diameter of said ball, another ball in the rear of said locking ball, retained by metal of the nut swaged in around the mouth of the drill hole and a spring between the latter ball and locking ball adapted to press the latter into engagement with the threads of the bolt but short enough so that when the locking ball is rolled inward, the end of the spring will not be pressed into the space where the bolt threads constrict the drill hole.

2. A nut lock for screw bolts of the class described, comprising a nut having hexagonal sides and a screw threaded bolt hole approximately one-half the diameter of the nut, said nut having a straight sided cylindrical hole of a diameter not less than one and one-quarter times the thickness of a screw thread, drilled into one of the hexagonal sides of the nut at an angle of 69 to 75 degrees to said side and at a point near but not cutting an adjacent side, said drill hole being directed so as to break into the interior threads substantially tangent to the tips or ridges of said threads and extending beyond the tangent point a distance not greater than its own diameter, in combination with a hard steel locking ball having a roughened surface loosely fitting said drill hole and adapted when at the point of tangency and in contact with the rear wall of the drill hole, to project into the bolt thread space approximately the depth of the screw thread yet substantially less than one-half the diameter of said ball, a spring and spring retaining means, for yieldingly pressing said locking ball into contact with the bolt threads when the nut is screwed on the bolt.

3. A lock nut for screw bolts of the class described, comprising a nut having an interior screw thread and a straight sided cylindrical hole of a diameter not less than one and one-quarter times the thickness of the screw thread drilled into one of the sides of the nut, directed so as to break into the interior threads approximately tangent to the tips or ridges of said threads and terminating so as to form a stop beyond said tangent point a distance less than the diameter of said hole, in combination with a hard steel locking ball having a roughened surface loosely fitting said hole and adapted when at the point of tangency and in contact with the rear wall of the drill hole, to project into the bolt thread space not less than three-quarters of the depth of said screw thread yet not more than two-fifths the diameter of said ball, a plug ball in the rear of said locking ball and a spring between said balls.

4. A nut lock for screw bolts of the class described, comprising a nut having hexagonal sides and a screw threaded bolt hole approximately one-half the diameter of the nut, said nut having a straight sided cylindrical hole drilled into one of the hexagonal sides of the nut at a point near but not cutting an adjacent side and at an angle acute to both said sides and directed so as to break through the interior threads tangentially and terminating so as to form a stop in the region of nearest approach to the axis of said nut, in combination with a hard steel locking ball loosely fitting said drill hole and adapted to engage the bolt threads from the entrance side of said drill hole, and a plug in the rear of said locking ball held by metal of the nut forced in around the mouth of the hole.

5. A lock nut formed with an interior screw thread and a hole drilled into one of the sides of the nut so as to intersect a portion of the interior threads of the nut, in combination with a locking member in said hole in wedging relation to the bolt thread and a closure for said hole consisting of a plug ball retained by engagement with the metal of the nut forced in around the mouth of the drill hole.

Signed at Detroit, in the county of Wayne and State of Michigan, this 6th day of April, A. D. 1918.

CHARLES C. WILLIAMS